United States Patent [19]

Toki et al.

[11] Patent Number: 5,051,203

[45] Date of Patent: Sep. 24, 1991

[54] PROCESS FOR PRODUCING PHOSPHOR

[75] Inventors: Hitoshi Toki; Yoshitaka Satoh, both of Mobara, Japan

[73] Assignee: Futaba Denshi Kogya K.K., Mobara, Japan

[21] Appl. No.: 617,088

[22] Filed: Nov. 23, 1990

[30] Foreign Application Priority Data

Nov. 24, 1989 [JP] Japan ................... 1-303252

[51] Int. Cl.$^5$ ............................................. C09K 11/62
[52] U.S. Cl. ....................... 252/301.6 R; 252/301.6 P
[58] Field of Search ................. 252/301.6 R, 301.6 P

[56] References Cited

U.S. PATENT DOCUMENTS 4,100,454 7/1978 Hase et al. .................. 252/301.6 R
4,791,336 12/1988 Morimoto et al. ........... 252/301.6 R

FOREIGN PATENT DOCUMENTS 2-178386 7/1990 Japan ......................... 252/301.6 R

*Primary Examiner*—Jack Cooper
*Attorney, Agent, or Firm*—Oblon, Spivak, McClelland, Maier & Neustadt

[57] ABSTRACT

A phosphor producing process capable of providing a phosphor of good quality in a reduced period of time. A Li compound acting as a doping agent is added prior to primary calcination so that it may also act as a flux and removed by washing prior to secondary calcination. A $ZnO \cdot Ga_2O_3$ solid solution thus obtained is activated in the secondary calcination using an atmosphere in which reducing gas and Zn gas are mixed. Thus, a $ZnO \cdot Ga_2O_3$:Li, P phosphor is which the molar ratio between Zn and $Ga_2O_3$ is 1:1 and of which crystals exhibit good surface conditions can be produced in a reduced period of time.

9 Claims, 3 Drawing Sheets

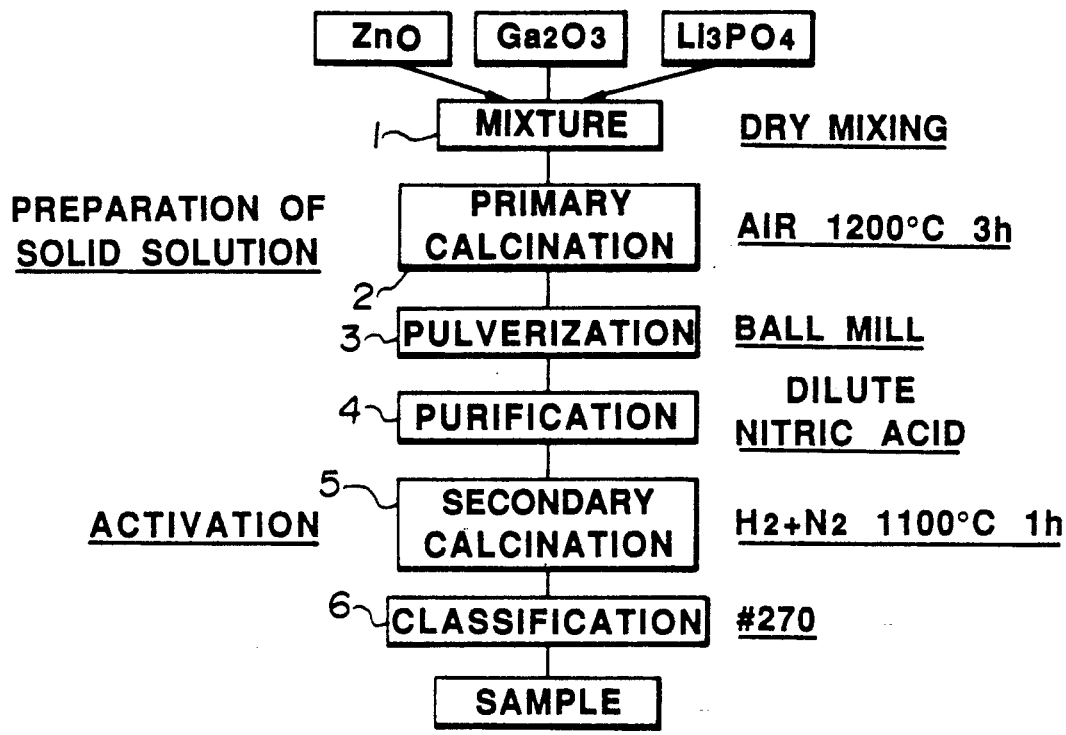
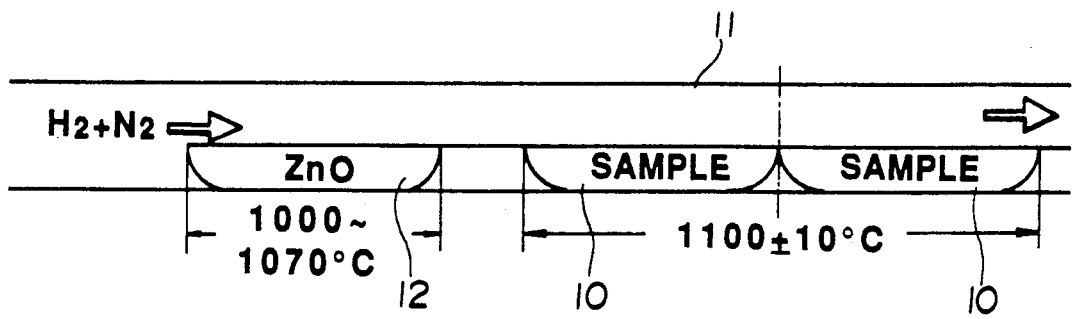

PROCESS FOR PRODUCING PHOSPHOR

BACKGROUND OF THE INVENTION

This invention relates to a process for producing a phosphor which is used for, for example, a luminous section of a fluorescent display device or the like and adapted to carry out emission of a blue luminous color due to excitation by an electron beam, and more particularly to a process for producing an oxide phosphor free of sulfur (S).

Such a conventional phosphor producing process is disclosed in, for example, Japanese Patent Application Laid-Open Publication No. 168789/1989 and typically practiced in such a way as shown in FIG. 4. More particularly, ZnO and $Ga_2O_3$ are fist mixed in equivalent molarities and subject to primary calcination. The primary calcination takes place in an air atmosphere at a temperature of 1300° C. for three hours, so that a $ZnO \cdot Ga_2O_3$ solid solution (mixed crystal) which constitutes a matrix of the phosphor may be prepared. Subsequently, the solid solution is pulverized and $Li_3PO_4$ is added thereto in an amount as small as $5 \times 10^{-2}$ to $4 \times 10^{-1}$ mol per 1 mol of the $ZnO \cdot Ga_2O_3$ solid solution to prepare a mixture, which is then subject to secondary calcination. The secondary calcination takes place in a reducing atmosphere of $H_2 + N_2$ at a temperature of 1000° C. for one hour, resulting in preparing a $ZnO \cdot Ga_2O_3$:Li, P phosphor. Then, it is washed with an acid to remove unreacted $Li_3PO_4$, leading to purification of the phosphor.

Unfortunately, the conventional phosphor producing process the following disadvantages.

$Li_3PO_4$ serves as a flux as well as a doping material, to thereby enhance the melting properties of the matrix. In the prior art, $Li_3PO_4$ is added to the matrix not in the primary calcination step but in the secondary calcination step. Thus, it fails to act as a flux during the preparation of the solid solution for the matrix, so that it is required to carry out the primary calcination at a temperature as high as 1300° C., resulting in an increase in heating costs. Also, the primary calcination fails to change all the starting materials to the solid solution irrespective of taking place at a temperature as high as 1300° C., so that the unreacted materials remains in the phosphor product. Further, the pulverization of the calcined solid solution requires much time because it exhibits large bond strength and damages the crystals of the solid solution.

Also, in the prior art, the unreacted or undoped $Li_3PO_4$ remaining in the phosphor after the activation of the phosphor in the secondary calcination is removed by washing with nitric acid. Unfortunately, during the washing, nitric acid partially attacks the surface of crystals of the activated phosphor, to thereby deteriorate the surface conditions of the phosphor.

As known in the art, it is the surface section of a phosphor of a depth as small as tens Å that emits light by excitation due to impingement of a low-velocity electron beam thereon in a fluorescent display device or the like. Thus, the surface conditions of a crystalline phosphor substantially affect the luminescence of the phosphor. Accordingly, the above-described disadvantages of the prior art cause the luminous characteristics of a phosphor of such type to be varied.

In addition, in the conventional phosphor producing process, as described above, ZnO and $Ga_2O_3$ are mixed in equivalent molarities to prepare the $ZnO \cdot Ga_2O_3$ solid solution serving as the matrix, which is then subject to the secondary calcination in the reducing atmosphere at a temperature of 1,100° C. for the purpose of doping the solid solution with Li and P and removing oxygen from the solid solution. However, as a result of experiments by the inventors, it was found that the secondary calcination causes ZnO in the matrix or solid solution to be reduced to Zn by heating, which is then scattered by vaporization because its boiling point is 930° C. TABLE 1 shows results of the experiments, wherein the residual ratio of each of the $ZnO \cdot Ga_2O_3$ solid solution and the components of the phosphor is indicated by weight percentage.

TABLE 1

| Calcination Atmosphere | Temp. (°C.) Time (min) | ZnO | $Ga_2O_3$ | $ZnGa_2O_4$ Air 1300° C. |
|---|---|---|---|---|
| | 1000 10 | 38.3 | 100 | 91.1 |
| $H_2/N_2$ 40/160 (ml/min) | 1000 30 | 12.9 | 100 | 87.8 |
| | 1000 75 | 0.25 | 100 | 80.6 |

The results shown in TABLE 1 indicate that the secondary calcination causes the amount of Zn contained in the matrix or solid solution to be substantially reduced. Thus, it will be noted that the conventional process exhibits a further disadvantage that the composition of the matrix after the secondary calcination is varied as compared with that prior to the calcination, resulting in luminance of the phosphor being reduced.

SUMMARY OF THE INVENTION

The present invention has been made in view of the foregoing disadvantages of the prior art.

Accordingly, it is an object of the present invention to provide a process for producing a phosphor which is capable of producing a phosphor of good quality in a reduced period of time.

It is another object of the present invention to provide a process for producing a phosphor which is capable of providing a phosphor with satisfactory surface conditions.

It is a further object of the present invention to provide a process for producing a phosphor which is capable of providing a phosphor with good crystalline conditions.

It is still another object of the present invention to provide a process for producing a phosphor which is capable of producing a phosphor having a composition as close to the ideal value as possible.

It is yet another object of the present invention to provide a process for producing a phosphor which is capable of producing a phosphor exhibiting increased luminance.

It is a still further object of the present invention to provide a process for producing a phosphor which is capable of producing a phosphor containing a $ZnO \cdot Ga_2O_3$ solid solution in which the molar ratio between ZnO and $Ga_2O_3$ is 1:1.

In accordance with the present invention, there is provided a process for producing a phosphor comprising the steps of mixing ZnO, $Ga_2O_3$ and a Li compound to prepare a mixture, calcining the mixture to form a solid solution, removing excessive Li compound by washing after pulverizing the solid solution, and calcining the washed solid solution in an atmosphere in which reducing gas and Zn gas are mixed, resulting in activating a $ZnO \cdot Ga_2O_3$ :Li phosphor.

In a preferred embodiment of the present invention, the Zn gas is produced by placing a $ZnO \cdot Ga_2O_3$ solid solution and ZnO in an oven to which the reducing gas is introduced and reducing the ZnO by calcination.

BRIEF DESCRIPTION OF THE DRAWINGS

These and other objects and many of the attendant advantages of the present invention will be readily appreciated as the same becomes better understood by reference to the following detailed description when considered in connection with the accompanying drawings in which like reference numerals designate like or corresponding parts throughout; wherein:

FIG. 1 is a flow chart showing an embodiment of a phosphor producing process according to the present invention;

FIG. 2 is a schematic diagram showing a secondary calcination step in the process shown in FIG. 1;

DETAILED DESCRIPTION OF THE PREFERRED EMBODIMENT

Figure 3:
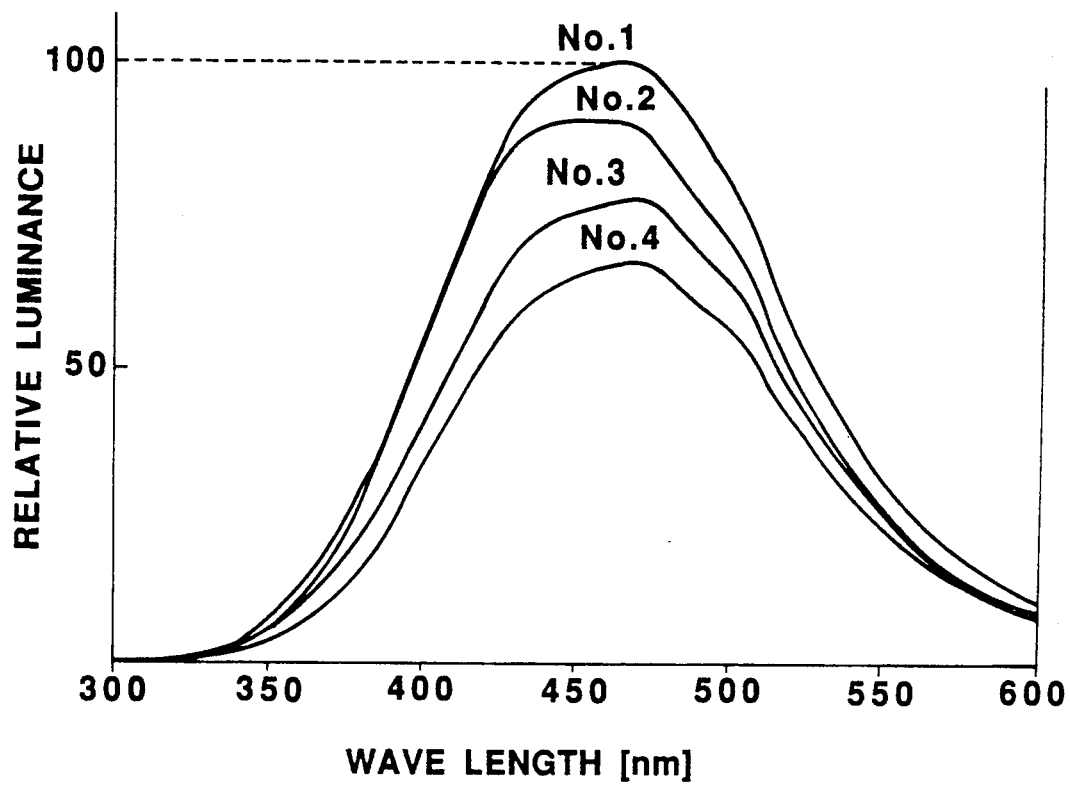
FIG. 3 is a graphical representation showing emission spectra of samples of a phosphor produced according to the present invention.
Figure 4:
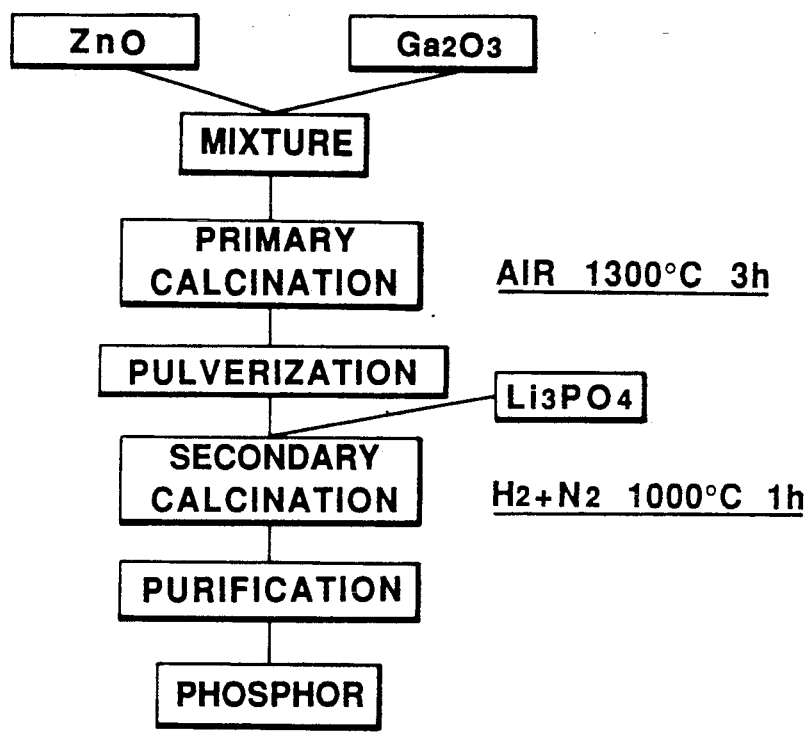
FIG. 4 is a flow chart showing a conventional phosphor producing process.

Now, a phosphor producing process according to the present invention will be described hereinafter with reference to FIGS. 1 to 3.

ZnO and $Ga_2O_3$ are weighed in amounts of 8.1 g and 18.7 g which correspond to equivalent molarities, and $Li_3PO_4$ which serves as a Li compound is weighed in an amount of 5.8 g which corresponds to $5 \times 10^{-1}$ mol based on 1 mol matrix. Then, ZnO, $Ga_2O_3$ and $Li_3PO_4$ thus weighed are fully subject to dry mixing using a mixer in a step 1 as shown in FIG. 1, resulting in a mixture. Wet mixing may be carried out as required. Also, a Li compound other than $Li_3PO_4$ such as lithium halide, lithium carbonate, lithium nitrate, lithium hydroxide, lithium sulfate or the like may be used.

In a step 2, the so-prepared mixture is placed in an alumina vessel and subject to primary calcination in an air atmosphere at 1200° C. which is significantly lower than the calcination temperature in the conventional process for three hours to prepare a solid solution. Conventionally, $Li_3PO_4$ is added in an amount of $1 \times 10^{-1}$ mol per 1 mol of the solid solution; however, in the present invention, $Li_3PO_4$ is added in an amount more than the amount to be doped in the solid solution, so that Li may effectively act also as a flux in the primary calcination step. This permits the primary calcination to take place at a temperature lower than in the prior art, to thereby form all the materials for the matrix into a solid solution of good crystallizability and permit Li and P to be effectively doped in the solid solution. Further, this reduces heating costs as compared with the prior art.

Then, in a step 3, the calcined solid solution is pulverized in a ball mill made of agate. The temperature of the primary calcination, as described above, is lower than in the prior art, so that the calcined solid solution exhibits relatively low bond strength. Thus, it may be easily pulverized, to thereby prevent the surface of crystals of the solid solution from being damaged during the pulverization.

Subsequently, in a step 4, the pulverized solid solution is washed with 0.5N dilute nitric acid to remove excessive $Li_3PO_4$ which was not doped in the solid solution. An analysis indicated that the washed solid solution contains $7 \times 10^{-2}$ mol Li.

In a step 5, the washed solid solution is subject to secondary calcination for activation. For this purpose, samples of the washed solution, as shown in FIG. 2, each are put in a vessel 10 made of alumina, which is then positioned at substantially the center of an oven of a reducing atmosphere at a temperature of 1100° + 10° C. As indicated at arrows in FIG. 2, $H_2$ gas and $N_2$ gas are supplied to the oven at rates of 40 ml/min and 160 ml/min, respectively. A vessel 12 made of alumina in which ZnO is placed is located in a place in the oven which is positioned forward of the solid solution based on the direction of flow of the $H_2$ gas and $N_2$ gas and at which a temperature is between 1000° C. and 1070° C. Alternatively, ZnO is added to the solid solution followed by mixing. This causes Zn to be scattered from ZnO in the vessel 12, resulting in Zn gas covering the solid solution samples together with $H_2$ and $N_2$ during the calcination step. This causes the solid solution to be calcined at about 1100° C. in the reducing atmosphere of high Zn vapor density, so that the scattering of Zn form ZnO in the solid solution may be minimized. Thus, the phosphor is activated while keeping the ratio of composition of the solid solution ideal or optimal.

TABLE 2 shows results of an experiment wherein the amount of ZnO placed forward of the solid solution in the oven is varied to vary an area of vaporization of ZnO (area ratio), to thereby vary the flow rate of ZnO.

TABLE 2

| Sample No. | Area Ratio | Amount of Flow of Zn (g) | $ZnGa_2O_4$ (wt %) | Zn:Ga Molar Ratio |
| --- | --- | --- | --- | --- |
| 1 | 100 | 7.7 | 100.0 | 1.00:2 |
| 2 | 50 | 5.2 | 98.3 | 0.87:2 |
| 3 | 30 | 4.0 | 96.9 | 0.86:2 |
| 4 | 0 | 0 | 82.8 | 0.60:2 |

"Amount of flow of Zn(g)" in TABLE 2 indicates the amount of scattering of Zn formed by reducing the ZnO arranged separate from the solid solution samples in the oven. "$ZnGa_2O_4$" indicates the residual ratio of the solid solution and "Zn:Ga Molar Ratio" indicates the molar ratio between Zn and Ga obtained by analysis of the phosphor synthesized.

As will be understood from TABLE 2, an increase in amount of flow of Zn increases the residual ratio of $ZnO \cdot Ga_2O_3$ synthesized, resulting in the molar ratio between Zn and Ga in the phosphor being 1:2 which is the ideal composition ratio.

FIG. 3 shows emission spectrum obtained by using each of the four samples (No. 1 to No. 4) for an anode luminous section of a fluorescent display device and then exciting it for luminescence.

As will be noted from FIG. 3, the phosphor of Sample No. 1 in which the amount of scattering of Zn from the solid solution is minimized exhibits the highest luminance. Also, in general, the more the amount of scattering of Zn from ZnO in the solid solution is, the less the luminance of the phosphor is.

A step 6 shown in FIG. 1 is to classify the phosphor in order to make the particle size of the phosphor uniform.

In the embodiment described above, ZnO is placed in the reducing atmosphere to generate Zn gas. Alternatively, Zn gas may be produced by decomposing an organic zinc compound and then introduced into the oven to increase Zn vapor density therein. An organic zinc compound such as, for example, diethyl zinc ($C_4H_{10}Zn$, boiling point: 118° C.), dimethyl zinc ($C_2H_6Zn$, boiling point: 46° C.) or the like may be used for this purpose.

As can be seen from the foregoing, in the process of the present invention, the addition of the Li compound serving as a doping material is carried out prior to the primary calcination to permit it to act also as a flux, so that the preparation of the solid solution is accomplished while decreasing the calcination temperature by 100° C. as compared with the prior art. This improves formation of the solid solution and decreases the bond strength of the solid solution to a degree sufficient to facilitate pulverization of the solid solution. Thus, the present invention significantly reduces time required for the pulverization to minimize damage to the surface of crystals of the solid solution, to thereby provide the phosphor with good surface conditions.

The Li compound which is useless after the primary calcination is removed by washing prior to the secondary calcination. Thus, even when the solid solution is partially attacked during the washing step, the crystalline conditions of the solid solution are improved in the subsequent secondary calcination.

The activation of the phosphor in the secondary calcination is carried out in the atmosphere in which reducing gas and Zn gas are mixed, so that the composition ratio of the matrix or $ZnO \cdot Ga_2O_3$ solid solution may be kept substantially at the ideal value.

Such advantages permit the $ZnO \cdot Ga_2O_3$:Li phosphor produced according to the present invention to exhibit significantly high luminance as compared with the prior art.

While a preferred embodiment of the invention has been described with a certain degree of particularity with reference to the drawings, obvious modifications and variations are possible in light of the above teachings. It is therefore to be understood that within the scope of the appended claims, the invention may be practiced otherwise than as specifically described.

What is claimed as new and desired to be secured by Letters Patent of the United States is:

1. A process for producing a $ZnO \cdot Ga_2O_3$:Li phosphor comprising the steps of:
   mixing equimolar amounts of ZnO and $Ga_2O_3$ and a Li compound in an amount which is in excess of that which is to be incorporated into phosphor to prepare a mixture;
   calcining said mixture in an air atmosphere at a temperature of no more than 1200° C. for three hours, to thereby form a solid solution;
   pulverizing said solid solution;
   washing said pulverized solid solution with nitric acid to remove excess Li compound;
   calcining said washed solid solution in a $H_2$ and $N_2$ reducing and Zn gas atmosphere at about 1100° C. so as to activate said washed solid solution, to thereby form said $ZnO \cdot Ga_2O_3$:Li phosphor; and
   classifying said $ZnO \cdot Ga_2O_3$:Li phosphor so as to effect a phosphor of uniform particle size.

2. A process as defined in claim 1, wherein said ZnO, $Ga_2O_3$ and Li compound are subjected to dry mixing.

3. A process as defined in claim 1, wherein said Li compound is selected from the group consisting of $Li_3PO_4$ lithium halide, lithium carbonate, lithium nitrate, lithium hydroxide and lithium sulfate.

4. A process as defined in claim 1, wherein said Li compound is mixed in an amount of $5 \times 10^{-1}$ mol based on 1 mole of $ZnO \cdot Ga_2O_3$.

5. A process as defined in claim 1, wherein said solid solution is activated by placing said solid solution and ZnO in an oven maintained in said H and $N_2$ reducing gas atmosphere and calcining said ZnO in said oven, thereby produce Zn gas from the ZnO to cover said solid solution together with said $H_2$ and $N_2$ reducing gas.

6. A process as defined in claim 5, wherein said ZnO is placed at a position ahead of said solid solution in relation to flow of said reducing gas in said oven which position is at a temperature of between 1000° C. and 1070° C.

7. A process as defined in claim 1, wherein said solid solution is activated by placing said solid solution in an oven into which Zn gas produced by decomposing an organic zinc compound is introduced together with said $H_2$ and $N_2$ reducing gas.

8. A process as defined in claim 7, wherein said organic zinc compound is diethyl zinc.

9. A process as defined in claim 7, wherein said organic zinc compound is dimethyl zinc.

* * * * *